(12) United States Patent
Liu

(10) Patent No.: US 12,060,866 B2
(45) Date of Patent: Aug. 13, 2024

(54) LOAD REDUCTION CONTROL METHOD FOR WIND TURBINE GENERATOR AND DEVICE

(71) Applicant: BEIJING GOLDWIND SCIENCE & CREATION WINDPOWER EQUIPMENT CO., LTD., Beijing (CN)

(72) Inventor: Zhongpeng Liu, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/997,194

(22) PCT Filed: Jun. 2, 2021

(86) PCT No.: PCT/CN2021/097983
§ 371 (c)(1),
(2) Date: Oct. 26, 2022

(87) PCT Pub. No.: WO2021/254153
PCT Pub. Date: Dec. 23, 2021

(65) Prior Publication Data
US 2023/0175484 A1    Jun. 8, 2023

(30) Foreign Application Priority Data
Jun. 15, 2020    (CN) .......................... 202010542560.5

(51) Int. Cl.
F03D 17/00    (2016.01)
F03D 7/02    (2006.01)
(Continued)

(52) U.S. Cl.
CPC ......... *F03D 7/0224* (2013.01); *F03D 7/0236* (2013.01); *F03D 7/043* (2013.01);
(Continued)

(58) Field of Classification Search
CPC ........ F03D 7/0224; F03D 7/043; F03D 7/024; F03D 7/045; F03D 17/00; F03D 17/011;
(Continued)

(56) References Cited

U.S. PATENT DOCUMENTS 6,619,918 B1    9/2003    Rebsdorf
2009/0169378 A1    7/2009    Menke
(Continued)

FOREIGN PATENT DOCUMENTS

CN    101469670 A    7/2009
CN    102102630 A    6/2011
(Continued)

OTHER PUBLICATIONS

First Chinese Office Action issued Jul. 9, 2022; Appln. No. 202010542560.5.
The extended European search report dated Aug. 10, 2023; Appln. No. 21826362.2.

*Primary Examiner* — Sabbir Hasan
*Assistant Examiner* — Arthur Paul Golik
(74) *Attorney, Agent, or Firm* — Frank Gao, Esq.

(57) ABSTRACT

Provided are a control method and apparatus for load reduction of a wind turbine. The control method for load reduction includes: determining a representative blade root load value of a wind turbine; determining an additional pitch rate value based on the representative blade root load value; determining a pitch rate control value based on a given pitch rate value and the additional pitch rate value; and applying the pitch rate control value to each blade of the wind turbine, to control each blade of the wind turbine to perform a pitch action.

12 Claims, 8 Drawing Sheets

(51) Int. Cl.
F03D 7/04 (2006.01)
F03D 80/00 (2016.01)

(52) U.S. Cl.
CPC ............. *F03D 17/00* (2016.05); *F03D 80/00* (2016.05); *F05B 2270/309* (2013.01); *F05B 2270/328* (2013.01); *F05B 2270/331* (2013.01)

(58) Field of Classification Search
CPC ............. F03D 17/029; F05B 2270/309; F05B 2270/331; F05B 2270/328; F05B 2270/332
See application file for complete search history.

(56) References Cited

U.S. PATENT DOCUMENTS

| | | | |
|---|---|---|---|
| 2016/0237988 A1* | 8/2016 | Perley | F03D 7/028 |
| 2018/0187647 A1* | 7/2018 | Perley | F03D 7/0224 |
| 2020/0056586 A1* | 2/2020 | Ehlers | F03D 7/0224 |
| 2020/0340447 A1 | 10/2020 | Jiang et al. | |

FOREIGN PATENT DOCUMENTS

| | | | |
|---|---|---|---|
| CN | 102966488 A | 3/2013 | |
| CN | 103742362 A | 4/2014 | |
| CN | 104214045 A | 12/2014 | |
| CN | 108533451 A | 9/2018 | |
| CN | 109751187 A | 5/2019 | |
| EP | 2 963 288 A1 | 1/2016 | |
| EP | 3 346 125 A1 | 7/2018 | |
| JP | 2016014361 A | 1/2016 | |
| WO | 2020/029324 A1 | 2/2020 | |

* cited by examiner

LOAD REDUCTION CONTROL METHOD FOR WIND TURBINE GENERATOR AND DEVICE

This application is the National Stage of International Application No. PCT/CN20211097983, titled "LOAD REDUCTION CONTROL METHOD FOR WIND TURBINE GENERATOR AND DEVICE," filed Jun. 2, 2021, which claims the benefit of and priority to Chinese Patent Application No. 202010542560.5, titled "CONTROL METHOD AND APPARATUS FOR LOAD REDUCTION OF WIND TURBINE," filed Jun. 15, 2020, the entireties of which are hereby incorporated herein by reference.

FIELD

The present disclosure generally relates to the technical field of wind power generation, and more particularly, to a control method and a control apparatus for load reduction of a wind turbine.

BACKGROUND

A wind turbine is driven by force on an impeller surface of the wind turbine, and an overall load level of the wind turbine may be reduced if a load on the impeller surface is reasonably reduced. Currently, common methods for load reduction mainly include an IPC (Independent Pitch Control) or a thrust control. The IPC may effectively reduce an unbalanced load on the impeller surface, and decrease an ultimate load and a fatigue load at the top of a tower. However, the IPC cannot significantly reduce the load at the bottom of the tower, and may greatly increase the fatigue load of an actuator. The thrust control usually takes power or other operating state of the wind turbine as an input. The thrust control can effectively reduce the overall load level of the wind turbine, but has a great impact on power generation, usually reducing the power generation by about 0.5%.

SUMMARY

Exemplary embodiments of the present disclosure are to provide a control method and a control apparatus for load reduction of a wind turbine, so as to overcome at least one of the above deficiencies.

In a general aspect, a control method for load reduction of a wind turbine is provided. The control method for load reduction includes: determining a representative blade root load value of a wind turbine; determining an additional pitch rate value based on the representative blade root load value; determining a pitch rate control value based on a given pitch rate value and the additional pitch rate value; and applying the pitch rate control value to each blade of the wind turbine, to control each blade of the wind turbine to perform a pitch action.

In another general aspect, a control apparatus for load reduction of a wind turbine is provided. The control apparatus for load reduction includes: a load value determination module, configured to determine a representative blade root load value of a wind turbine; an additional pitch value determination module, configured to determine an additional pitch rate value based on the representative blade root load value; a pitch control value determination module, configured to determine a pitch rate control value based on a given pitch rate value and the additional pitch rate value; and a pitch control module, configured to apply the pitch rate control value to each blade of the wind turbine, to control each blade of the wind turbine to perform a pitch action.

In a further general aspect, a control system for load reduction of a wind turbine is provided. The control system for load reduction includes: a load sensor. The load sensor is arranged at a blade root of the wind turbine, and is configured to detect a blade root load value of each blade. The control system for load reduction further includes a controller. The controller is configured to: acquire, from the load sensor, the blade root load value of each blade; determine, based on the acquired blade root load value of each blade, a representative blade root load value of the wind turbine; determine an additional pitch rate value based on the representative blade root load value; determine a pitch rate control value based on a given pitch rate value and the additional pitch rate value; and apply the pitch rate control value to each blade of the wind turbine, to control each blade of the wind turbine to perform a pitch action.

In yet another general aspect, a controller is provided. The controller includes a processor, an input/output interface, and a memory storing a computer program. The computer program, when executed by the processor, causes the control method for load reduction of a wind turbine to be implemented.

In yet another general aspect, a computer-readable storage medium storing a computer program is provided. The computer program, when executed by a processor, causes the control method for load reduction of a wind turbine to be implemented.

With the control method and the control apparatus for load reduction of a wind turbine according to exemplary embodiments of the present disclosure, an overall load level of the wind turbine can be greatly reduced with little impact on power generation.

BRIEF DESCRIPTION OF THE DRAWINGS

The above and other objectives, features and advantages of exemplary embodiments of the present disclosure will become more apparent from the following detailed description in conjunction with the accompanying drawings which exemplarily illustrate the embodiments.

DETAILED DESCRIPTION

Various exemplary embodiments are fully described with reference to the accompanying drawings, in which some of the exemplary embodiments are shown.

Figure 1:
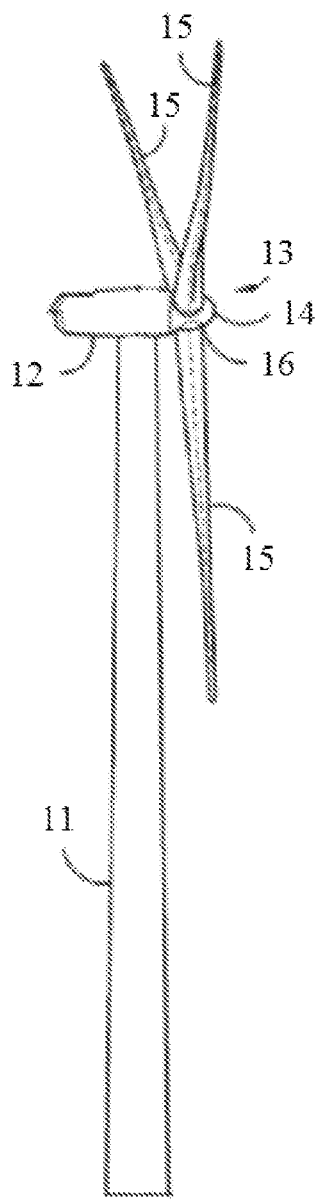
FIG. 1 shows a schematic diagram of a wind turbine according to an exemplary embodiment of the present disclosure.

FIG. 1 shows a schematic diagram of a wind turbine according to an exemplary embodiment of the present disclosure.

A wind turbine 10 includes a tower 11, a nacelle 12 at the apex of the tower 11, a generator (not shown) accommodated in the nacelle 12, and a rotor 13 connected to the generator. In addition to the generator, the nacelle 12 may further include various components required for converting wind energy to electrical energy, and various components required for operating, controlling and optimizing performance of the wind turbine 10. The rotor 13 may include a hub 14 and multiple blades 15 protruding outward from the hub 14. Exemplarily, the rotor 14 includes three blades 15. It should be noted that the number of the blades 15 may vary. In addition, the wind turbine 10 further includes a control system. The control system may be disposed inside the nacelle 12, or may be distributed at multiple positions in the wind turbine 10 and communicatively connected.

In an example, the wind turbine 10 may include a pitch controller. The pitch controller may control the blades 15 of the wind turbine 10 to perform a pitch action.

In an embodiment, the pitch controller may be designed as an individual controller, or may be included in a controller (also referred to as a stand-alone controller) of the wind turbine. The controller of the wind turbine may directly provide a pitch signal to the pitch controller. The pitch controller controls the blades 15 to perform a pitch action, in response to the pitch signal.

The wind turbine 10 may be further provided with various sensors, such as a load sensor, a wind speed sensor, a power output sensor, and the like. Other sensors as known in the art may be possible, such as sensors for sensing temperature, rain, spindle torsion, blade surface pressure, blade bearings, bolt or hub strain, and the like.

In an embodiment of the present disclosure, the load sensor 16 may be arranged at a root of each blade 15 of the wind turbine 10, and detect a blade root load value of each blade. The controller (the pitch controller or the controller of the wind turbine) may acquire the blade root load value of each blade from the load sensor 16, and determine, based on the acquired blade root load value of each blade, a representative blade root load value of the wind turbine, apply a rate control value to each blade of the wind turbine, so as to control each blade of the wind turbine to perform a pitch action.

Figure 2:
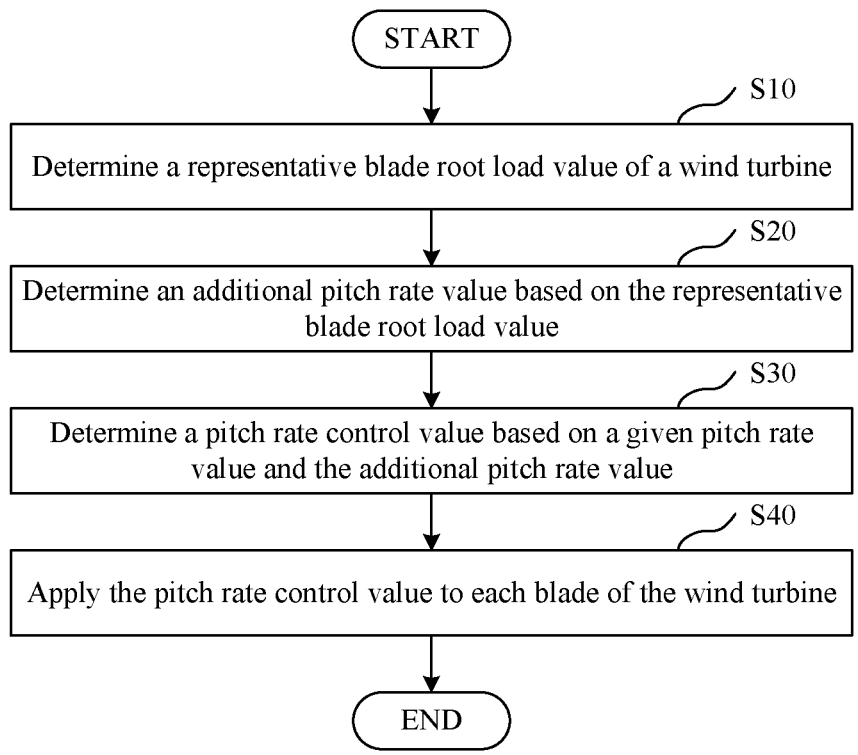
FIG. 2 shows a flowchart of a control method for load reduction of a wind turbine according to an exemplary embodiment of the present disclosure.
Figure 3:
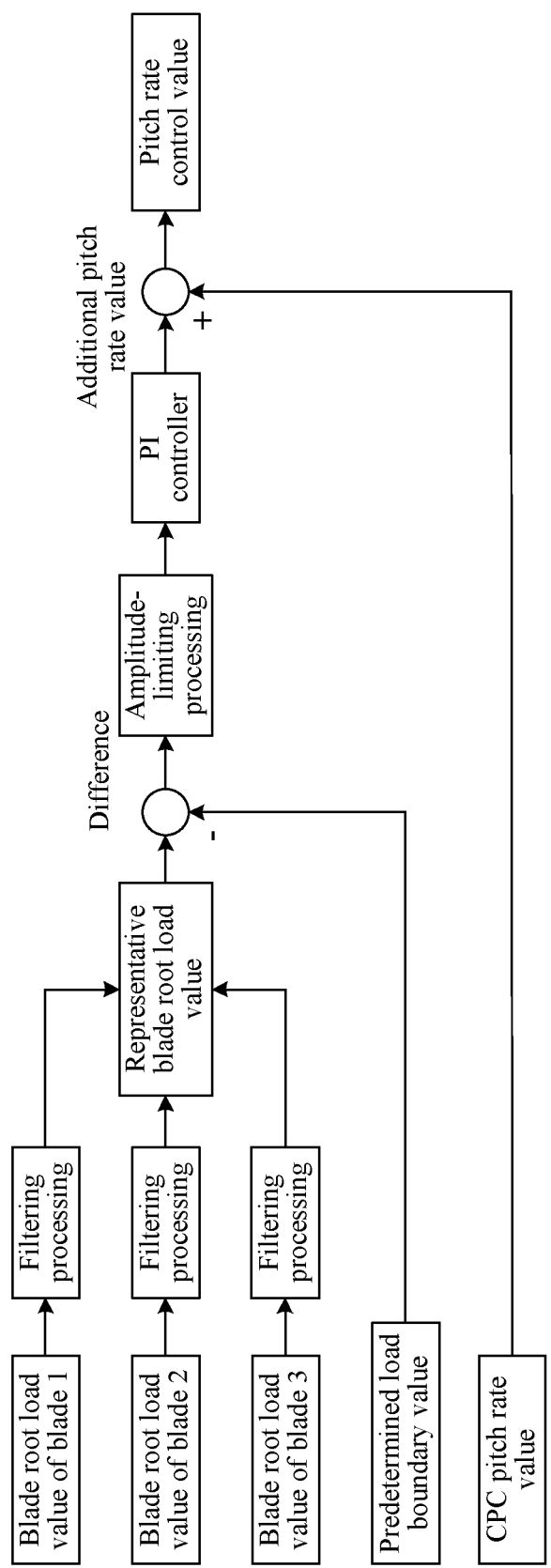
FIG. 3 shows a control block diagram of a control method for load reduction of a wind turbine according to an exemplary embodiment of the present disclosure.
Figure 4A:
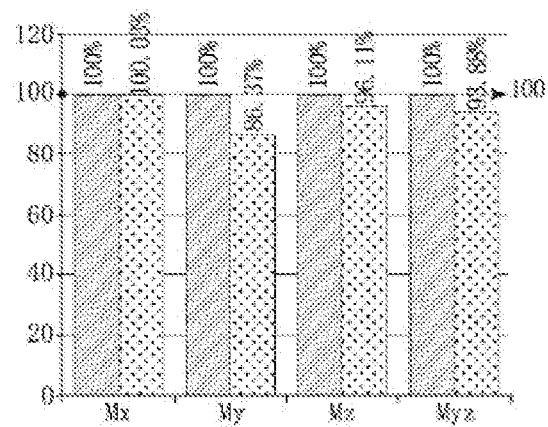
FIG. 4A to FIG. 4F show comparative schematic diagrams of ultimate loads of various components of a wind turbine according to an exemplary embodiment of the present disclosure.
Figure 4B:
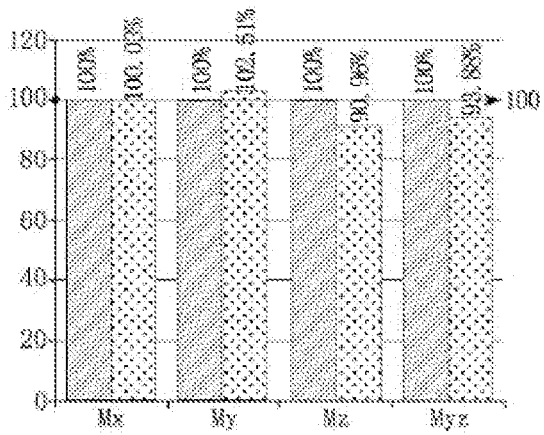
Figure 4C:
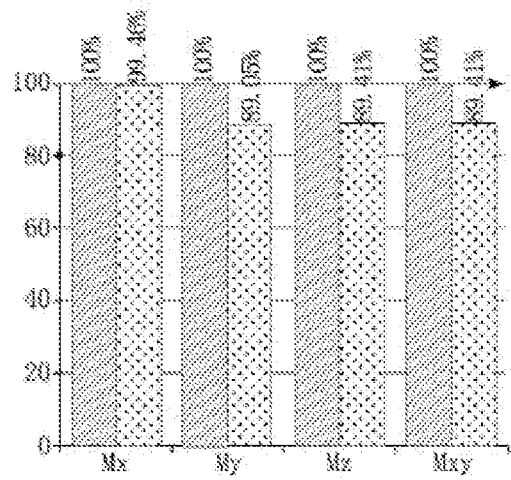
Figure 4D:
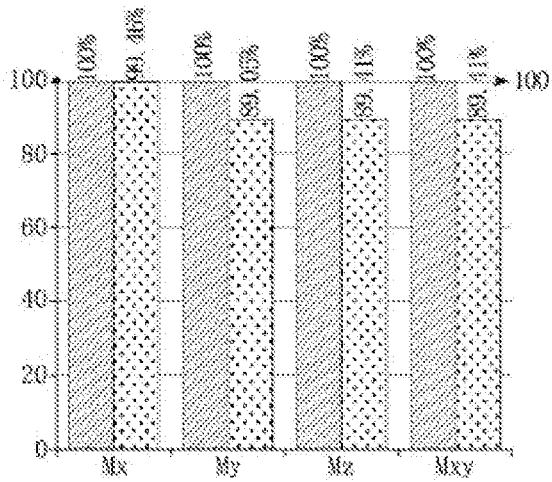
Figure 4E:
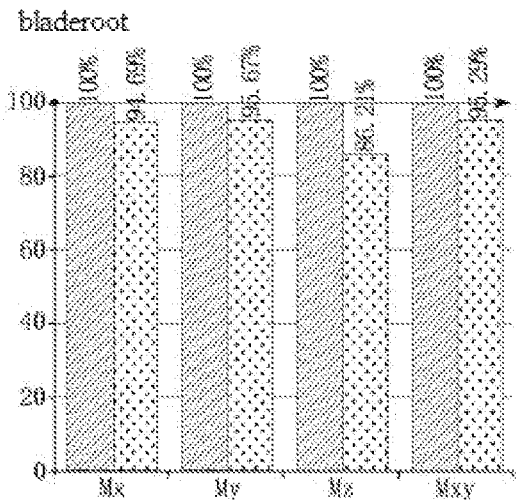
Figure 4F:
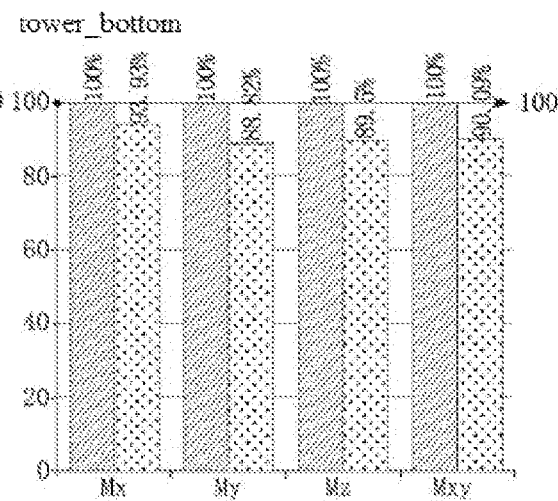
Figure 5A:
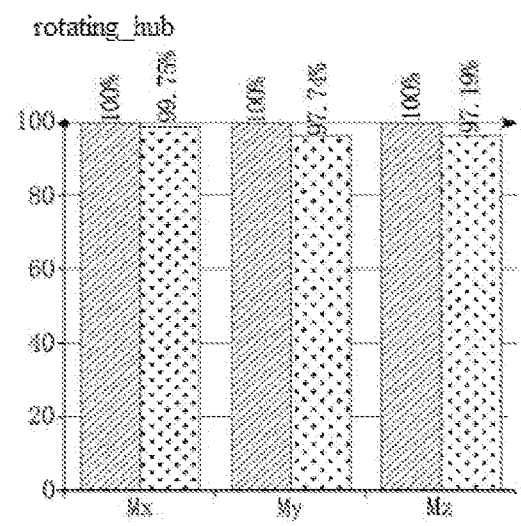
FIG. 5A to FIG. 5F show comparative schematic diagrams of fatigue loads of various components of a wind turbine according to an exemplary embodiment of the present disclosure.
Figure 5B:
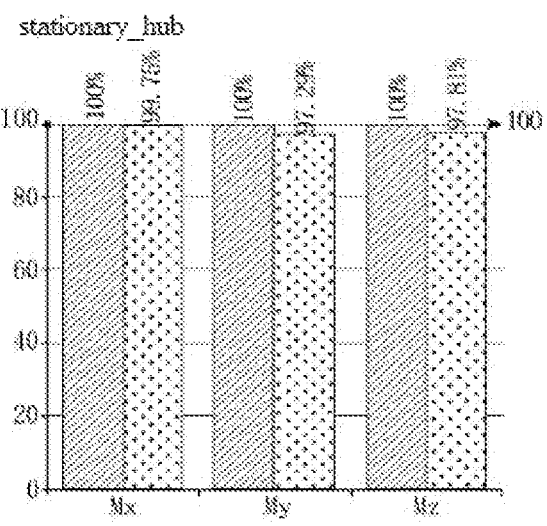
Figure 5C:
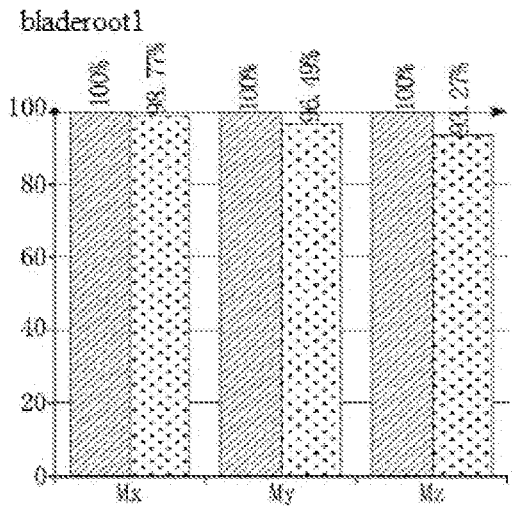
Figure 5D:
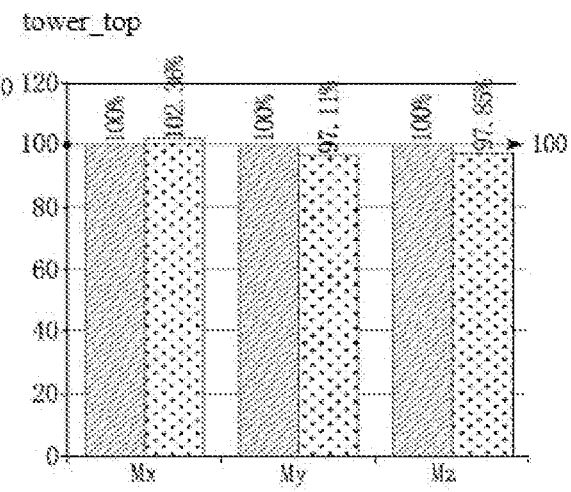
Figure 5E:
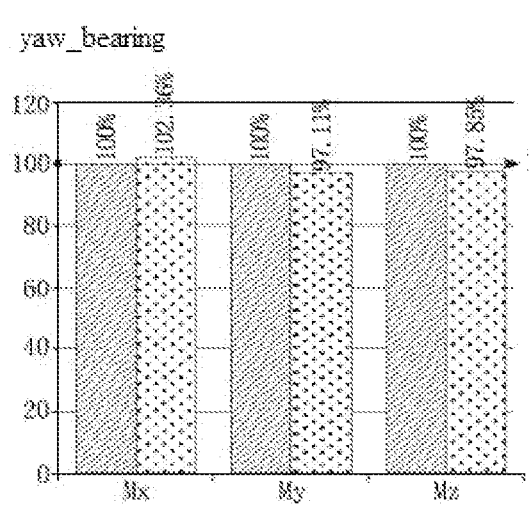
Figure 5F:
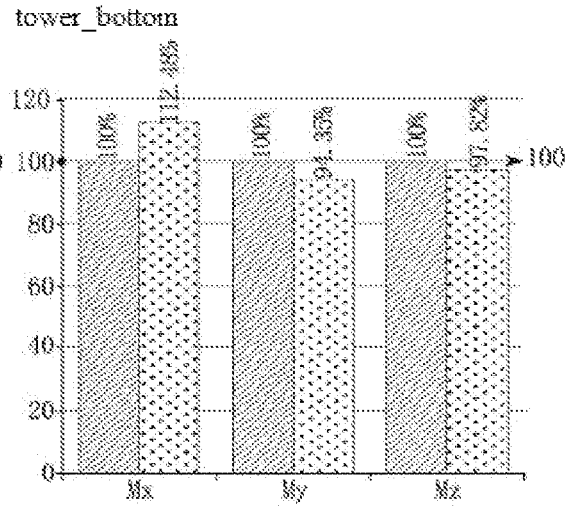

FIG. 2 shows a flow chart of a control method for load reduction of a wind turbine according to an exemplary embodiment of the present disclosure. FIG. 3 shows a control block diagram of a control method for load reduction of a wind turbine according to an exemplary embodiment of the present disclosure. A control process for load reduction of the wind turbine according to an exemplary embodiment of the present disclosure is described below with reference to FIG. 2 and FIG. 3.

Reference is made to FIG. 2. In step S10, a representative blade root load value of a wind turbine is determined.

Here, the wind turbine may include one or more blades. For example, the wind turbine may include, but is not limited to, three blades.

In an example, a load sensor may be provided at the blade root of each blade of the wind turbine, so as to detect a blade root load value of each blade. In this case, for each blade of the one or more blades, a blade root load value (e.g., blade root load value Mxy) of the blade may be acquired, and a maximum value among blade root load values of the blades is determined as the representative blade root load value.

Taken FIG. 3 as an example in which it is assumed that the wind turbine includes three blades, blade root load values of the three blades are acquired respectively, and a maximum value among the acquired three blade root load values is determined as the representative blade root load value.

In an embodiment, a filtering processing (e.g., digital filtering processing) may be performed on the acquired blade root load value of each blade, to filter out high-frequency noise and fixed modal frequency signals of the wind turbine.

It should be understood that the described manner of determining the representative blade root load value is only an example, and the present disclosure is not limited thereto. Other manners may also be adopted to determine the representative blade root load value. For example, an average value, a middle value, or the like, of the blade root load values of the blades may be determined as the representative blade root load value.

In step S20, an additional pitch rate value is determined based on the representative blade root load value.

In an example, the additional pitch rate value may be determined based on a comparison of the representative blade root load value with a predetermined load boundary value.

For example, a difference between the representative blade root load value and the predetermined load boundary value may be determined, and the additional pitch rate value may be determined based on the difference.

Taken FIG. 3 as an example, the predetermined load boundary value may serve as a reference input to a PI controller, the representative blade root load value may serve as an original input to the PI controller, and a difference between the representative blade root load value and the predetermined load boundary value is inputted to the PI controller as an original error signal. In a preferred embodiment, an amplitude-limiting processing may be performed on the error signal.

For example, a process of performing the amplitude-limiting processing on the error signal may be as follows. The difference is compared with an amplitude limit, and if the difference is less than the amplitude limit, the additional pitch rate value is acquired based on the amplitude limit. For example, the additional pitch rate value is obtained via a PI controller based on the amplitude limit, that is, the amplitude limit serves as an input to the PI controller to acquire the additional pitch rate value.

If the difference is greater than or equal to the amplitude limit, the additional pitch rate value is acquired based on the difference. For example, the additional pitch rate value is obtained via a PI controller based on the difference, that is, the difference between the representative blade root load value and the predetermined load boundary value serves as an input to the PI controller to acquire the additional pitch rate value.

In an example, the amplitude limit may be zero, that is, a lower limit of the amplitude-limiting processing may be set to zero, and an upper limit is not necessary to be set.

Through such amplitude-limiting processing, the additional pitch rate value will not be a negative value, so as to avoid an adverse effect on a load and constant speed control. Regarding the value of the amplitude limit, the present disclosure is not limited, and those skilled in the art may set the amplitude limit to other value.

In an exemplary embodiment of the present disclosure, a detection result of the load sensor at the blade root serves as a control input. After the predetermined load boundary value is determined through simulation, the PI controller is designed to output the additional pitch rate value, to ensure the blade root load value of the wind turbine not to exceed the predetermined load boundary value. Thereby, an overall load level of the wind turbine can be greatly reduced with little impact on power generation.

In the control method for load reduction of a wind turbine according to an exemplary embodiment of the present disclosure, the control is based on the load, and an action is made only when the load exceeds a target value, thereby having little impact on the power generation. However in the conventional thrust control, due to thrust control regardless of the amplitude of the load, a pitch angle value is increased as long as a power fall within a function-enabling range even if the load is not large, resulting in a greater impact on power generation.

Figure 9:
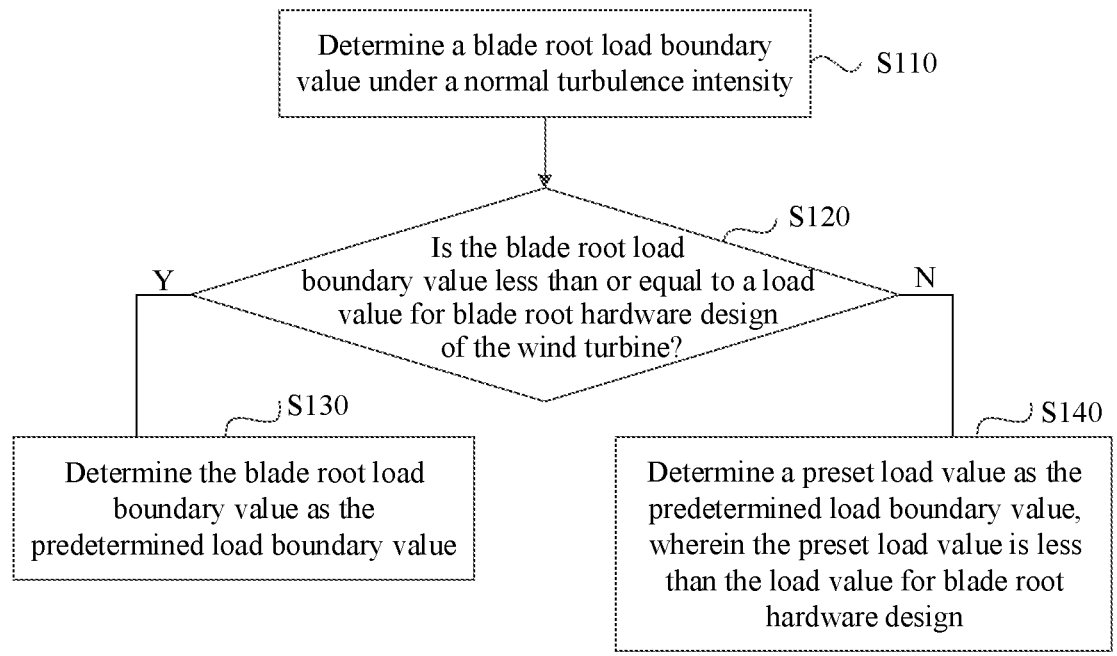
FIG. 9 shows a flowchart of a method for determining a predetermined load boundary value according to an exemplary embodiment of the present disclosure.

A process of determining the predetermined load boundary value is described below reference to FIG. 9.

For example, the predetermined load boundary value may be determined as follows. A blade root load boundary value under a normal turbulence intensity is determined (step S110); and if the blade root load boundary value is less than or equal to a load value for blade root hardware design of the wind turbine (step S120, Y), the blade root load boundary value is determined as the predetermined load boundary value (step S130). In this case, since the representative blade root load value of the wind turbine would not exceed the load value for blade root hardware design, triggering the load reduction control strategy in the present disclosure to apply the additional pitch rate value will not affect the power generation of the wind turbine.

Here, after the wind turbine is designed and installed, each component of the wind turbine has a load value for hardware design, and the load value for blade root hardware design of the wind turbine is used during the process of determining the predetermined load boundary value. In addition, a turbulence intensity value less than or equal to a preset turbulence intensity value may be determined as the normal turbulence intensity. For example, the value of the normal turbulence intensity may be determined based on a design specification in the field of wind power.

If the blade root load boundary value is greater than the load value for blade root hardware design of the wind turbine (step S120, N), a preset load value is determined as the predetermined load boundary value (step S140). Here, the preset load value is less than the load value for blade root hardware design, to ensure a safe operation of the wind turbine. As an example, those skilled in the art may set the preset load value based on an actual requirement, which is not limited in the present disclosure. In this case, triggering the load reduction control strategy in the present disclosure to apply an additional pitch rate value may have little impact on power generation of the wind turbine.

In an example, the blade root load boundary value under the normal turbulence intensity may be determined as follows. Blade root load values of the wind turbine under different working conditions under the normal turbulence intensity are acquired. A maximum value among the acquired blade root load values under the different working conditions is determined as the blade root load boundary value under the normal turbulence intensity.

For example, it may be obtained blade root load values of the blades of the wind turbine under different working conditions under the normal turbulence intensity, and a maximum value among the obtained blade root load values may be determined as the blade root load boundary value.

In step S30, a pitch rate control value is determined based on a given pitch rate value and the additional pitch rate value.

For example, a sum of the given pitch rate value and the additional pitch rate value may be determined as the pitch rate control value. Here, the given pitch rate value may refer to a pitch rate value of the wind turbine under a rotational speed control strategy (that is, under a collective pitch control CPC strategy).

In step S40, the pitch rate control value is applied to each blade of the wind turbine, to control each blade of the wind turbine to perform a pitch action.

With the control method for load reduction of a wind turbine according to the exemplary embodiments of the present disclosure, a minimum pitch angle value may be effectively increased.

FIG. 4A to FIG. 4F show comparative schematic diagrams of ultimate loads of various components of a wind turbine according to an exemplary embodiment of the present disclosure.

In examples shown in FIG. 4A to FIG. 4F, bar graphs on the left show ultimate load values of various components of the wind turbine without using the load reduction control strategy according to an exemplary embodiment of the present disclosure, and bar graphs on the right show ultimate load values of various components of the wind turbine with the load reduction control strategy according to an exemplary embodiment of the present disclosure. It can be seen from FIG. 4A to FIG. 4F that differences between an ultimate load for the wind turbine without the load reduction control strategy and an ultimate load for the wind turbine with the load reduction control strategy may be obtained through simulation.

FIG. 5A to FIG. 5F show comparative schematic diagrams of fatigue loads of various components of a wind turbine according to an exemplary embodiment of the present disclosure.

In examples shown in FIG. 5A to FIG. 5F, bar graphs on the left show fatigue load values of various components of the wind turbine without using the load reduction control strategy according to an exemplary embodiment of the present disclosure, and bar graphs on the right show fatigue load values of various components of the wind turbine with the load reduction control strategy according to an exemplary embodiment of the present disclosure. It can be seen from FIG. 5A to FIG. 5F that differences between a fatigue load for the wind turbine without the load reduction control strategy and a fatigue load for the wind turbine with the load reduction control strategy may be obtained through simulation.

It can be seen from the above figures that, with the load reduction control strategy for the wind turbine according to the exemplary embodiments of the present disclosure, the ultimate loads of the key components of the wind turbine are reduced greatly to different degrees, and the fatigue loads of the key components of the wind turbine are also decreased to different degrees. In counting the power generation, a loss to the power generation is about 0.1%. Therefore, with the control method for load reduction of a wind turbine according to the exemplary embodiments of the present disclosure, the ultimate load and the fatigue load of the wind turbine may be greatly reduced with little impact on power generation.

Figure 6:
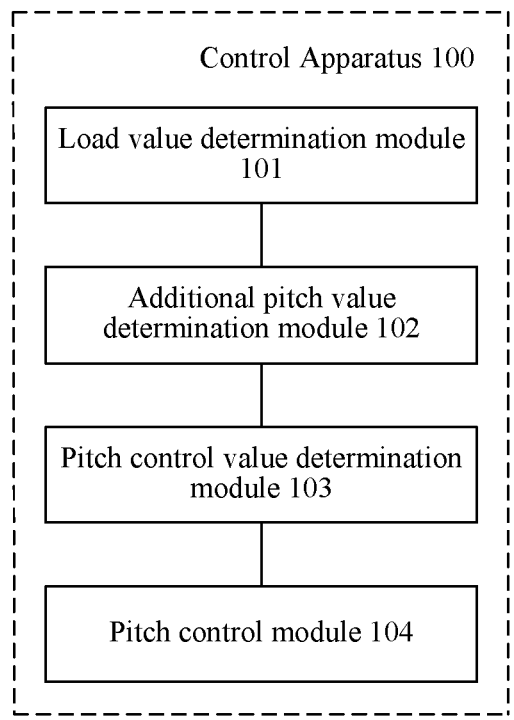
FIG. 6 shows a block diagram of a control apparatus for load reduction of a wind turbine according to an exemplary embodiment of the present disclosure.

FIG. 6 shows a block diagram of a control apparatus for load reduction of a wind turbine according to an exemplary embodiment of the present disclosure.

As shown in FIG. 6, a control apparatus 100 for load reduction of a wind turbine according to an exemplary embodiment of the present disclosure includes a load value determination module 101, an additional pitch value determination module 102, a pitch control value determination module 103, and a pitch control module 104.

The load value determination module 101 is configured to determine a representative blade root load value of a wind turbine.

Here, the wind turbine may include one or more blades. For example, the wind turbine may include but is not limited to three blades.

In an example, a load sensor may be provided at the blade root of each blade of the wind turbine, and the load sensor is used for detecting a blade root load value of each blade. In this case, the load value determination module 101 may acquire the blade root load value of each blade of the one or more blades, and determine a maximum value among the acquired blade root load values of the one or more blades as the representative blade root load value.

The additional pitch value determination module 102 is configured to determine an additional pitch rate value based on the representative blade root load value.

In an example, the additional pitch value determination module 102 may determine the additional pitch rate value based on a comparison of the representative blade root load value with a predetermined load boundary value. For example, the additional pitch value determination module 102 may determine a difference between the representative blade root load value and the predetermined load boundary value, and determine the additional pitch rate value based on the difference.

The additional pitch value determination module 102 may be configured to: take the predetermined load boundary value as a reference input to a PI controller, take the representative blade root load value as an original input to the PI controller, and input a difference between the representative blade root load value and the predetermined load boundary value to the PI controller as an original error signal. In a preferred embodiment, the additional pitch value determination module 102 may perform an amplitude-limiting processing on the error signal.

For example, a process of the additional pitch value determination module 102 performing the amplitude-limiting processing on the error signal may be as follows. The additional pitch value determination module 102 is configured to compare the difference with an amplitude limit, and acquire the additional pitch rate value based on the amplitude limit in response to the difference being less than the amplitude limit. For example, the additional pitch value determination module 102 may be configured to obtain the additional pitch rate value via a PI controller based on the amplitude limit, that is, take the amplitude limit as an input to the PI controller to obtain the additional pitch rate value.

The additional pitch value determination module 102 is configured to acquire the additional pitch rate value based on the difference, in response to the difference being greater than or equal to the amplitude limit. For example, the additional pitch value determination module 102 may be configured to obtain the additional pitch rate value via a PI controller based on the difference, that is, take the difference between the representative blade root load value and the predetermined load boundary value as an input to the PI controller to obtain the additional pitch rate value. In an example, the amplitude limit may be zero, that is, a lower limit of the amplitude-limiting processing may be set to zero.

For example, the additional pitch value determination module 102 may determine the predetermined load boundary value as follows. The additional pitch value determination module 102 may determine a blade root load boundary value under a normal turbulence intensity; and determine the blade root load boundary value as the predetermined load boundary value, in response to the blade root load boundary value being less than or equal to a load value for blade root hardware design of the wind turbine. In this case, since the representative blade root load value of the wind turbine would not exceed the load value for blade root hardware design, triggering the load reduction control strategy in the present disclosure to apply the additional pitch rate value will not affect the power generation of the wind turbine.

The additional pitch value determination module 102 may determine a preset load value as the predetermined load boundary value, in response to the blade root load boundary value being greater than the load value for blade root hardware design of the wind turbine. Here, the preset load value is less than the load value for blade root hardware design, to ensure a safe operation of the wind turbine. As an example, those skilled in the art may set the preset load value based on an actual requirement, which is not limited in the present disclosure. In this case, triggering the load reduction control strategy in the present disclosure to apply an additional pitch rate value may have little impact on power generation of the wind turbine.

In an example, the additional pitch value determination module 102 is configured to: acquire blade root load values of the wind turbine under different working conditions under the normal turbulence intensity, and determine a maximum value among the acquired blade root load values under the different working conditions as the blade root load boundary value under the normal turbulence intensity.

For example, the additional pitch value determination module 102 may obtain blade root load values of the blades of the wind turbine under different working conditions under the normal turbulence intensity, and determine a maximum value among the obtained blade root load values as the blade root load boundary value.

The pitch control value determination module 103 is configured to determine a pitch rate control value based on a given pitch rate value and the additional pitch rate value.

For example, the pitch control value determination module 103 may determine a sum of the given pitch rate value and the additional pitch rate value as the pitch rate control value. Here, the given pitch rate value may refer to a pitch rate value of the wind turbine under a rotational speed control strategy (that is, under a collective pitch control CPC strategy).

The pitch control module 104 is configured to apply the pitch rate control value to each blade of the wind turbine, to control each blade of the wind turbine to perform a pitch action.

Figure 7:
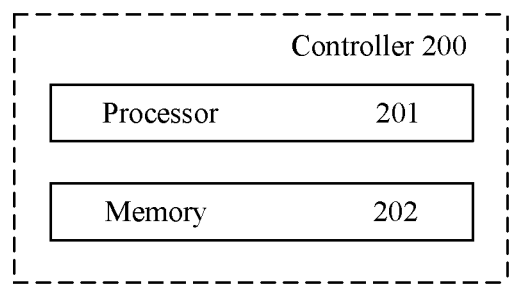
FIG. 7 shows a block diagram of a controller according to an exemplary embodiment of the present disclosure.

FIG. 7 shows a block diagram of a controller according to an exemplary embodiment of the present disclosure.

As shown in FIG. 7, a controller 200 according to an exemplary embodiment of the present disclosure includes a processor 201 and a memory 202.

Specifically, the memory 202 stores a computer program. The computer program, when executed by the processor 201, causes the above control method for load reduction of a wind turbine to be implemented.

Here, the control method for load reduction of a wind turbine shown in FIG. 2 may be executed in the processor 201 as shown in FIG. 7. That is, each module shown in FIG. 6 may be implemented by a general-purpose hardware processor such as a digital signal processor or a field programmable gate array, or by a special-purpose hardware processor such as a special-purpose chip, or totally implemented by software through a computer program, for example, may be implemented as modules in the processor 201 as shown in FIG. 7.

A control system for load reduction of a wind turbine is further provided according to an exemplary embodiment of the present disclosure. The control system for load reduction includes a load sensor and a controller.

The load sensor is arranged at a blade root of a wind turbine and is configured to detect a blade root load value of each blade. In a case where the wind turbine includes one or more blades, a load sensor may be disposed at the blade root of each blade, so as to detect the blade root load value of each blade.

The controller is configured to: acquire, from the load sensor, the blade root load value of each blade; determine, based on the acquired blade root load value of each blade, a representative blade root load value of the wind turbine; determine an additional pitch rate value based on the representative blade root load value; determine a pitch rate control value based on a given pitch rate value and the additional pitch rate value; and apply the pitch rate control value to each blade of the wind turbine, to control each blade of the wind turbine to perform a pitching action.

Figure 8:
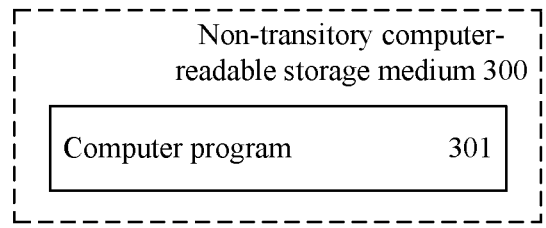
FIG. 8 shows a block diagram of a non-transitory computer-readable storage medium according to an exemplary embodiment of the present disclosure.

A computer-readable storage medium 300 storing a computer program 301 is further provided according to an exemplary embodiment of the present disclosure, as shown in FIG. 8. The computer program 301, when executed by a processor, causes the processor to perform the above control method for load reduction of the wind turbine. The computer-readable storage medium 300 is any data storage device capable of storing data read by a computer system. An example of the computer-readable storage medium 300 includes a read-only memory, a random-access memory, a CD-ROM, a magnetic tape, a floppy disk, an optical data storage device, and a carrier wave (such as data transmission through the Internet via a wired or wireless transmission path).

With the control method and the control apparatus for load reduction of a wind turbine according to the exemplary embodiments of the present disclosure, a load level of the wind turbine can be reduced significantly, a cost of the wind turbine can be reduced, while having little impact on power generation.

Although the present disclosure has been illustrated and described with reference to the exemplary embodiments thereof, it should be understood by those skilled in the art that various modifications may be made to the form or detail of the embodiments, without departing from the spirit and scope of the disclosure as defined in the claims.

The invention claimed is:

1. A control method for load reduction of a wind turbine comprising multiple blades, comprising:
   determining a representative blade root load value of the wind turbine;
   determining an additional pitch rate value based on the representative blade root load value;
   determining a pitch rate control value based on a given pitch rate value and the additional pitch rate value; and
   applying the pitch rate control value to each of the multiple blades of the wind turbine, to control each of the multiple blades of the wind turbine to perform a pitch action.

2. The control method for load reduction according to claim 1, wherein
   the determining the representative blade root load value of the wind turbine comprises:
   acquiring blade root load values of the multiple blades; and
   determining a maximum value among the acquired blade root load values of the multiple blades, as the representative blade root load value.

3. The control method for load reduction according to claim 1, wherein the determining the additional pitch rate value based on the representative blade root load value comprises:
   determining a difference between the representative blade root load value and a predetermined load boundary value; and
   acquiring the additional pitch rate value based on the difference.

4. The control method for load reduction according to claim 3, wherein the acquiring the additional pitch rate value based on the difference comprises:
   comparing the difference with an amplitude limit; and
   acquiring the additional pitch rate value based on the amplitude limit, in response to the difference being less than the amplitude limit; or
   acquiring the additional pitch rate value based on the difference, in response to the difference being greater than or equal to the amplitude limit.

5. The control method for load reduction according to claim 4, wherein
   the acquiring the additional pitch rate value based on the difference comprises:
   acquiring the additional pitch rate value via a PI controller based on the difference, and/or
   the acquiring the additional pitch rate value based on the amplitude limit comprises:
   acquiring the additional pitch rate value via the PI controller based on the amplitude limit.

6. The control method for load reduction according to claim 3, wherein the predetermined load boundary value is determined by:
   determining a blade root load boundary value under a normal turbulence intensity; and
   determining the blade root load boundary value as the predetermined load boundary value, in response to the blade root load boundary value being less than or equal to a load value for blade root hardware design of the wind turbine; or
   determining a preset load value as the predetermined load boundary value, in response to the blade root load boundary value being greater than the load value for blade root hardware design of the wind turbine, wherein the preset load value is less than the load value for blade root hardware design.

7. The control method for load reduction according to claim 6, wherein the determining the blade root load boundary value under the normal turbulence intensity comprises:
   acquiring blade root load values of the wind turbine under different working conditions under the normal turbulence intensity; and determining a maximum value among the acquired blade root load values under the different working conditions, as the blade root load boundary value under the normal turbulence intensity.

8. The control method for load reduction according to claim 1, wherein the pitch rate control value is equal to a sum of the given pitch rate value and the additional pitch rate value,
wherein the given pitch rate value refers to a pitch rate value of the wind turbine under a rotational speed control strategy.

9. A controller, comprising:
a processor; and
a memory storing a computer program, wherein
the computer program, when executed by the processor, causes the control method for load reduction of a wind turbine comprising blades according to claim 1 to be implemented.

10. A non-transitory computer-readable storage medium storing a computer program, wherein
the computer program, when executed by a processor, causes the control method for load reduction of a wind turbine comprising multiple blades according to claim 1 to be implemented.

11. A control apparatus for load reduction of a wind turbine comprising multiple blades, comprising:
a memory storing a computer program; and
a processor, wherein the processor, when executing the computer program, is configured to:
determine a representative blade root load value of the wind turbine;
determine an additional pitch rate value based on the representative blade root load value;
determine a pitch rate control value based on a given pitch rate value and the additional pitch rate value; and
apply the pitch rate control value to each of the multiple blades of the wind turbine, to control each of the multiple blades of the wind turbine to perform a pitch action.

12. A control system for load reduction of a wind turbine comprising multiple blades, comprising:
a load sensor, arranged at a blade root of each of the multiple blades of the wind turbine, wherein each load sensor is configured to detect a blade root load value of each of the multiple blades, and
a controller, configured to:
acquire, from each load sensor, the respective blade root load value of each of the multiple blades,
determine, based on the acquired blade root load value of each of the multiple blades, a representative blade root load value of the wind turbine,
determine an additional pitch rate value based on the representative blade root load value,
determine a pitch rate control value based on a given pitch rate value and the additional pitch rate value; and
apply the pitch rate control value to each of the multiple blades of the wind turbine, to control each of the multiple blades of the wind turbine to perform a pitch action.

* * * * *